United States Patent
Grass

[19]

[11] Patent Number: 6,023,107
[45] Date of Patent: Feb. 8, 2000

[54] CIRCUIT ARRANGEMENT FOR CONTROLLING A WIPER MOTOR

[75] Inventor: Ansgar Grass, Offenburg, Germany

[73] Assignee: Robert Bosch GmbH, Stuttgart, Germany

[21] Appl. No.: 09/043,543

[22] PCT Filed: Jul. 8, 1997

[86] PCT No.: PCT/DE97/01435

§ 371 Date: Mar. 23, 1998

§ 102(e) Date: Mar. 23, 1998

[87] PCT Pub. No.: WO98/03376

PCT Pub. Date: Jan. 29, 1998

[30] Foreign Application Priority Data

Jul. 23, 1996 [DE] Germany ............... 196 29 597

[51] Int. Cl.[7] .................. B60L 1/00; B60L 3/00
[52] U.S. Cl. .............. 307/10.1; 15/250.16; 318/443; 318/445; 318/471; 318/472
[58] Field of Search ............... 307/10.1; 15/250.17, 15/250.16; 219/203; 318/DIG. 2, 443, 444, 445, 472, 471

[56] References Cited

U.S. PATENT DOCUMENTS

| 3,573,585 | 4/1971 | Taylor | 318/472 |
|---|---|---|---|
| 3,624,477 | 11/1971 | Rieman | 318/443 |
| 3,919,612 | 11/1975 | Ratzel et al. | 318/DIG. 2 |
| 4,866,359 | 9/1989 | Schmid et al. | 318/471 |

FOREIGN PATENT DOCUMENTS 2852676  6/1980  Germany .

*Primary Examiner*—Albert W. Paladini
*Attorney, Agent, or Firm*—Venable; George H. Spencer; Norman N. Kunitz

[57] ABSTRACT

Suggested is a switching arrangement for actuating a wiper motor (10) for windshield wiper arrangements, which functions to protect the power switching element (13), designed as semiconductor, and the wiper motor (10) against permanent destruction caused by blocking and overload. The switching arrangement comprises a temperature monitoring of the semiconductor end stage (29), which short-circuits the power switching element (13) in case of a motor (10) overload and simultaneous heating up of the power switching element and shuts down the motor (10), as well as a parking position monitoring of the wiper lever, in order to shut down the motor completely if the wiper lever is blocked (FIG. 1).

12 Claims, 2 Drawing Sheets a)

b)

c)

CIRCUIT ARRANGEMENT FOR CONTROLLING A WIPER MOTOR

STATE OF THE TECHNOLOGY

The invention is based on a switching arrangement for a wiper motor for windshield wiper arrangements with a time-dependent and temperature-dependent load monitoring, wherein the wiper motor can be actuated via a power switching element, in connection with a means for detecting the parking position of a wiper lever and a thereon dependent control of the power switching element. A known switching arrangement of this type for a wiper motor (DE 28 52 676 IC2) combines a switching stage dependent on the rotational speed and a switching stage dependent on the temperature. The switching stage dependent on the rotational speed compares the time intervals between the pulses depending on the rotational speed with a reference value and, in this case, is configured such that a switching element will trigger a switching signal for turning off the motor only if the rotational speed of the motor is very slow or the motor is blocked. Once the malfunction has been corrected, the wiper motor operation is started up again automatically by turning the switching element on and off periodically. The motor temperature is additionally monitored to avoid a long shut-down is period, designed to protect the motor, by sensing the voltage drop at the armature winding of the motor, and the switching element can thus be switched off via an additional switching stage. This occurs through a regular switching of a relay to alternate between a voltage source and a constant current source. If the constant current source is connected through the relay and via the motor to a ground, then the motor temperature is determined with the aid of the armature winding resistance. No motor temperature can be determined if the voltage source is connected through the relay and via the motor to a ground.

If several pulses are triggered with each wiping cycle, one disadvantage of the pulse detection depending on the rotational speed is that a reference value is necessary, which takes on varying values, depending on the angle position for the wiper lever, thus requiring an involved circuit. A further disadvantage is that the temperature of the switching arrangement itself is not monitored. Thus, if a semiconductor switch is used as power switching element, the power switching element is not protected against a thermal overload and thus is not protected against destruction.

Another disadvantage lies in the fact that it is not possible to simultaneously monitor the temperature and supply the motor with voltage. Thus, the motor must be shut down each time for the temperature monitoring, which increases wear and tear of the motor and shortens its service life.

SUMMARY AND ADVANTAGES OF THE INVENTION

The present invention provides an improved circuit arrangement for actuating a wiper motor for windshield wiper arrangements with a time-dependent and temperature-dependent load monitoring, wherein the circuit arrangement comprises: a wiper motor that can be actuated via a semiconductor power switching element that is controlled by a control unit that is responsive to a signal from a means for detecting the parking position of a wiper lever and, produces a thereon dependent control signal with time dependent monitoring of the power switching element; circuit means for monitoring a chip temperature of at least the semiconductor chip of the power switching element and for shutting down the power switching element when a threshold temperature is detected; and wherein, in order to protect the wiper motor against an overload and blocking, the control unit responds to a time-dependent load monitoring signal provided by the means for indicating the parking position when the chip-temperature monitoring means responds, and shuts down the wiper motor completely.

The arrangement according to the invention, has the advantage that the motor as well as the power switching element are protected through a chip-temperature monitoring against a thermal overload. It is therefore possible to omit a cooling of the semiconductor end stage and to use low-cost SMD (Surface Mounted Device) technology for this stage. In addition, the switching arrangement is less involved.

To be sure, a temperature monitoring for semiconductor power switches is known from the magazine Elektor 4/93, page 41, where a temperature sensor and a thyristor are additionally integrated on a chip. If the power switching element heats up strongly, the temperature sensor ignites the thyristor and thus blocks the power switching element. This does not provide an overload safety for the load connected to the power switching element. Thus, when using a weak motor, it is possible that in the load circuit, the blocking current for the blocked motor would lead to an insufficient heating up of the semiconductor end stage, and the chip temperature monitoring would not respond. The motor would then be blocked permanently and would be damaged.

As a result of the combination of parking position monitoring and chip temperature monitoring, the semiconductor end stage and the motor are equally protected, wherein the semiconductor end stage is suitable for motors with varying capacity.

It must also be mentioned here that the temperature-dependent and the time-dependent monitoring occurs at the same time as the wiping operation, meaning that a start-up or a shut-down of the motor is not necessary.

Various advantageous modifications and improvements of the features according to the basic invention are disclosed. One particular advantage is the option of being able to use a self-blocking FET as power switching element, for which the gate is connected to a control depending on the means for detecting the parking position and which has a thyristor that is parallel-connected to the gate-source-path.

Another advantage results from the option of being able to use a cheaper FET with higher start-up resistance $R_{DSon}$ since the danger of a thermal overload of the end stage is not given in the blocking case.

BRIEF DESCRIPTION OF THE DRAWING

One exemplary embodiment of the invention is shown in the drawing and is explained in further detail in the following description.

DETAILED DESCRIPTION OF THE EXEMPLARY EMBODIMENT

Figure 1:
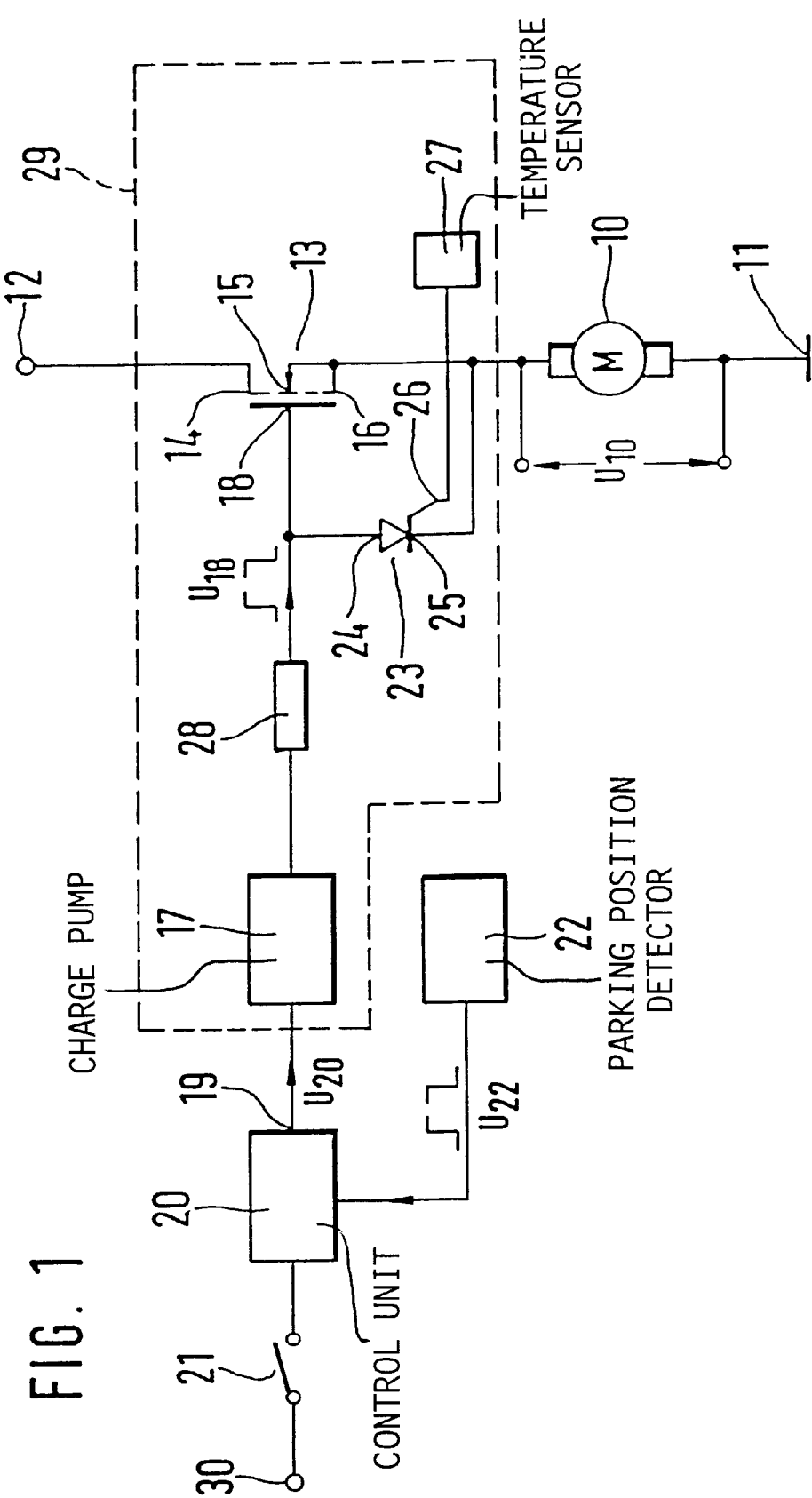
FIG. 1 shows a block diagram for actuating a rear wiper motor and FIG. 2 shows voltage diagrams of the circuit for various operational cases.

The switching arrangement according to the invention comprises a rear wiper motor 10 as a load, which is connected on one side to a ground 11. The positive pole 12 of a battery voltage is switched to a n-channel FET 13, via the rear wiper motor 10. In this case, the drain 14 is connected to the positive pole 12 and the source 15 to the rear wiper motor 10. Source 15 and substrate 16 of the FET 13 are short-circuited. The FET 13 is controlled with a positive voltage, which is fed to the gate 18 by a charge pump 17 that is known per se. The charge pump 17 and thus also the FET 13 are clocked by a control signal $U_{20}$ at the control output 19 of a control unit 20. Alternatively, the charge pump 17 can also comprise an internal clock generator, so that the FET 13 is switched on only via a static signal from the control unit 20. In this exemplary embodiment, the control unit 20 has a microcontroller. A toggle switch 21, which is supplied by an ignition lock switch 30, (terminal 15), is assigned to the control 20 and turns the control 20 on and off. The control 20 receives parking position signals $U_{22}$ from a means for detecting the parking position, which for this embodiment is a parking position sensor 22 (e.g., a Hall sensor).

Parallel to the gate-source-path of the FET 13, a thyristor 23 is connected such that its anode 24 is connected to the gate 18 and its cathode 25 to the source 15. At its control electrode 26, the thyristor 23 is controlled by a temperature sensor 27, which is connected heat-conducting to the FET 13, as is known per se. A current-limiting resistance 28 is installed between the charge pump 17 and the gate 18 or the thyristor 23. The current-limiting resistance 28 could be omitted with a correspondingly high internal resistance of the charge pump 17. The FET 13, the thyristor 23, the temperature sensor 27, the charge pump 17 and the current-limiting resistance 28 form the semiconductor end stage 29 of the switching arrangement.

Figure 2:
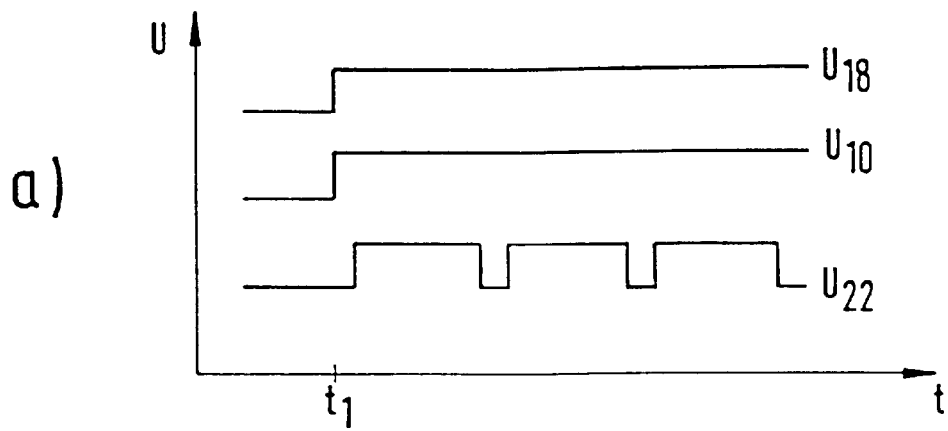
Figure 2:
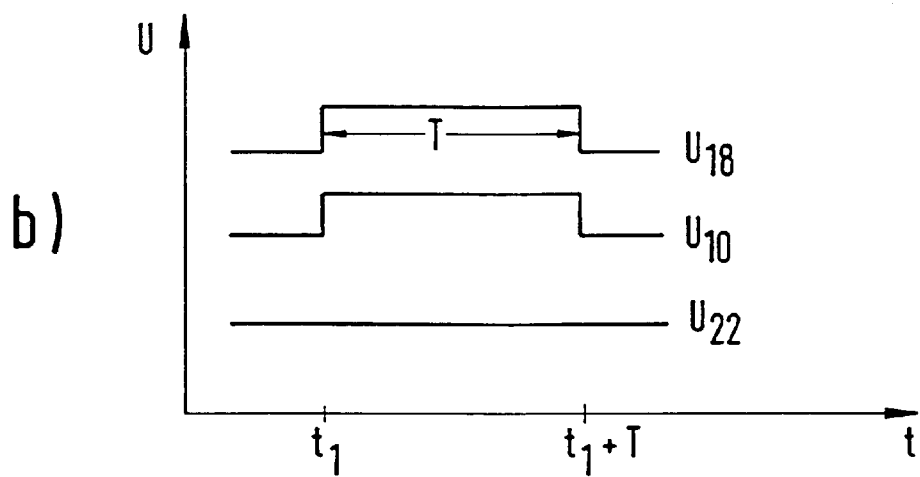
Figure 2:
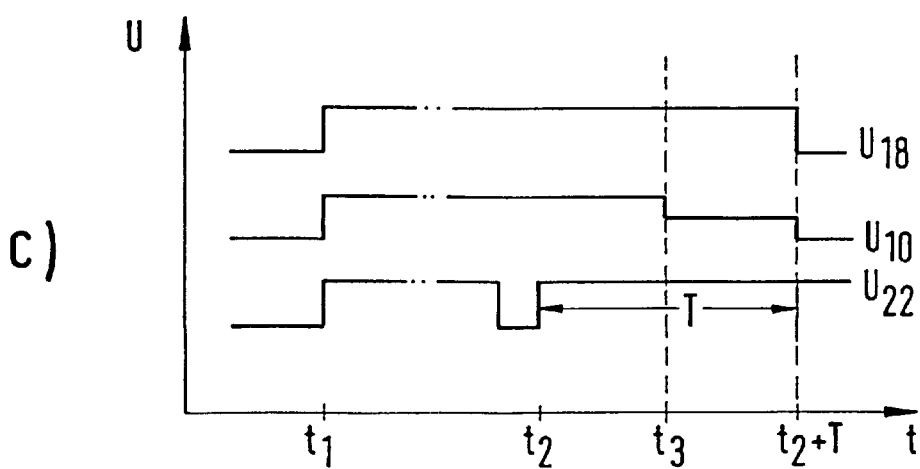

As can be seen in the voltage curves in FIG. 2, the switching arrangement for actuating a wiper motor according to FIG. 1 operates as follows:

The rear wiper motor 10 is switched with the aid of a power switch, which in this embodiment is a self-blocking n-channel FET 13. The rear wiper motor 10 is actuated at point in time $t_1$ with the voltage $U_{10}$, in dependence on the voltage $U_{18}$ that is present at the gate 18. If there is no voltage $U_{18}$ at the gate 18, then the is FET 13 blocks and the load circuit is switched off. If the voltage $U_{18}$ exceeds the FET 13 threshold voltage at gate 18, the FET 13 becomes conductive and the battery voltage present between the positive pole 12 and the ground 11 drops primarily at the rear wiper motor 10. It means that the voltage $U_{18}$ would drop again and become negative and the FET would block once more. In order to prevent this, the charge pump 17 is connected to gate 18. The charge pump 17 provides the necessary additional positive voltage $U_{18}$, preferably double the battery voltage, which leaves the FET 13 in the conductive condition.

The FET 13 is controlled by the charge pump 17, which is clocked by the control 20 or is clocked internally. For the undisturbed operation according to FIG. 2a, the wiping lever performs the wiping activity preset by the control 20.

A means for detecting the parking position, which for the present embodiment is a parking position sensor 22, supplies parking position signals $U_{22}$ to the control 20 to detect interferences in the normal wiping operation. Two different digital signals appear in this case, depending on whether the wiping lever is in the parking position or not. In the present embodiment, the signals can alternate between 0 Volt and 5 Volt or between 0 Volt and the battery voltage. The 0 Volt signal occurs with the parking position. The signal changes are relevant for the regulation of the control.

For the exemplary case according to FIG. 2b, a malfunction occurs at point in time $t_1$, owing to the fact that the wiping lever is frozen onto the rear windshield. The signal changes consequently do not occur and the FET 13 is blocked, following a maximum time T for supplying current that is preset by the control 20, and the rear wiper motor 10 is turned off. The maximum time T for supplying current depends on the adjusted, maximum possible wiping cycle length. The exemplary value provided for the maximum possible wiping cycle length for an outside temperature of −40° C. is 7 seconds.

Another example of a malfunction that can be detected by the parking position sensor 22 is the blocking of the wiping lever during the wiping operation as a result of snow blowing onto the windshield or other obstacles.

Malfunctions such as the continuous wiping on a dry windshield, meaning an overload of the rear wiper motor 10, are detected in accordance with FIG. 2c through the temperature monitoring. For this, the thyristor 23, which is controlled by the temperature sensor 27, is parallel-connected to the gate-source-path 18-15 of the FET 13. During the uninterrupted operation, the thyristor 23 is blocked. In case of an overload of the rear wiper motor 10, the FET 13 heats up. Once the maximum permissible substrate temperature of the FET 13 is reached at point in time $t_3$, the temperature sensor 27 ignites the thyristor 23, which short-circuits the gate-source-path 18-15. As a result of the series connection of the current limiting resistance 28 with the ignited thyristor 23, the resulting voltage drop at the thyristor 23 is so small that it falls below the threshold voltage of the FET 13 and the load circuit is shut down. The charge pump 17 then functions as voltage source against ground 11. In this circuit, the current limiting resistance 28, the conductive thyristor 23 and the rear wiper motor 10 are connected in series.

The thyristor 23 remains conductive as long as the anode current of the thyristor 23 is higher than its holding current. In that case, the rear wiper motor 10 continues to receive current. However, as a result of the voltage drop at the current limiting resistance 28, the drop in the voltage $U_{10}$ at the rear wiper motor 10 is negligibly small, which leads to a shutting down of the rear wiper motor 10 (point in time $t_3$). The current limiting resistance 28 takes over the function of a voltage divider.

If the rear wiper motor 10 is shut down, the signal change from the parking position sensor 22 to the control 20 does not occur (point in time $t > t_3$) and following the maximum time interval T for a supply with current, preset by the control 20, the voltage drop at the thyristor 23 becomes so small—because the charge pump 17 is shut down by connecting the ground 11 to the resistance 28—that the anode current falls below the holding current and the thyristor 23 blocks (point in time $t_2 + T$). This results in an additional action of the temperature monitoring stage that is conceived as feedback in that a blocking through shutting down of the motor 10 is simulated when the chip temperature monitoring responds. As a result of this, the parking position sensor 22 as time-dependent load monitor shuts down the wiper motor completely and finally.

I claim:

1. A circuit arrangement for actuating a wiper motor (10) for windshield wiper arrangements with a time-dependent and temperature-dependent load monitoring, said circuit arrangement comprising: a wiper motor (10) that can be actuated via a semiconductor power switching element (13) that is controlled by a control unit that is responsive to a signal from a means (22) for detecting the parking position of a wiper lever and produces a thereon dependent control signal with time dependent monitoring of the power switching element (13); circuit means for monitoring a chip temperature of at least the semiconductor chip of the power switching element and for shutting down the power switching element (13) when a temperature above a given temperature is detected; and wherein, in order to protect the wiper motor (10) against an overload and blocking, the control unit responds to a time-dependent load monitoring signal provided by the means for indicating the parking position when the chip temperature monitoring means responds, and shuts down the wiper motor (10) completely.

2. A switching arrangement according to claim 1, wherein the means (22) provided for detecting the parking position, is a parking position sensor, a Hall sensor or a contact disk, the signals ($U_{22}$) of which are fed to the control unit (20).

3. A switching arrangement according to claim 1, wherein a self-blocking FET is provided as the power switching element (13), the gate (18) of which is connected to the control unit (20) that depends on the means (22) for detecting the parking position, and that the circuit means for monitoring the temperature includes a thyristor (23) that is parallel-connected to a gate-source-path (18-15) of the FET.

4. A switching arrangement according to claim 3, wherein once a specific temperature is reached, a temperature sensor (27) that is mounted on the semiconductor end stage (29) ignites the thyristor (23) and short-circuits the gate-source-path (18-15) of the power switch (13).

5. A switching arrangement according to claim 4, wherein the gate (18) is connected via a charge pump (17) to the control unit (20) that transmits a control signal ($U_{20}$) to the gate, which is amplified by the charge pump (17) such that the power switch (13) remains controllable in the conductive state as well.

6. A switching arrangement according to claim 5, wherein a capacitor, which can be charged and discharged cyclically, a controller or a discrete circuit that clocks the charging pump (17) can be used as the control unit (20).

7. A switching arrangement according to claim 5, wherein a signal change of th means (22) for detecting the parking position occurs, either when the wiper lever leaves its parking position or when it returns to the parking position, and if this signal change does not occur, it leads to a shut-down of the wiper motor (10) following a maximum time interval (T) during which current is supplied and which is predetermined by the control unit.

8. A switching arrangement according to claim 5, wherein a current-limiting resistance (28) is connected between the charge pump (17) and the power switching element (13) as an automatic protection for the semiconductor end stage (29).

9. A switching arrangement according to claim 3 wherein the gate (18) is connected via a charge pump (17) to the control unit (20) that transmits a control signal ($U_{20}$) to the gate, which is amplified by the charge pump (17) such that the power switch (13) remains controllable in the conductive state as well.

10. A switching arrangement according to claim 9, wherein a capacitor, which can be charged and discharged cyclically, a controller or a discrete circuit that clocks the charging pump (17) can be used as the control unit (20).

11. A switching arrangement according to claim 9, wherein a signal change of the means (22) for detecting the parking position occurs, either when the wiper lever changes its parking position or when it returns to the parking position, and if this signal change does not occur, it leads to a shut-down of the wiper motor (10) following a maximum time interval (T) during which current is supplied and which is predetermined by the control unit.

12. A switching arrangement according to claim 9, wherein a current-limiting resistance (28) is connected between the charge pump (17) and the power switching element (13) as an automatic protection for the semiconductor end stage (29).

* * * * *